(12) United States Patent
Driscoll et al.

(10) Patent No.: US 10,140,645 B2
(45) Date of Patent: Nov. 27, 2018

(54) INTELLIGENT FUEL PURCHASING RECOMMENDATIONS

(71) Applicant: PAYPAL, INC., San Jose, CA (US)

(72) Inventors: Dennis Michael Driscoll, Chalfont, PA (US); Michael Charles Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 1015 days.

(21) Appl. No.: 14/449,974

(22) Filed: Aug. 1, 2014

(65) Prior Publication Data

US 2016/0035001 A1  Feb. 4, 2016

(51) Int. Cl.
*G06Q 30/00* (2012.01)
*G06Q 30/06* (2012.01)

(52) U.S. Cl.
CPC .............................. *G06Q 30/0631* (2013.01)

(58) Field of Classification Search
CPC .... G07C 5/008; G01C 21/34; G06Q 20/3278; G06Q 50/30; G06Q 30/0639; G06Q 20/20
USPC ............................................... 705/26.1, 27.1
See application file for complete search history.

(56) References Cited

U.S. PATENT DOCUMENTS

| | | | |
|---|---|---|---|
| 8,630,791 B2 | 1/2014 | Yuasa | |
| 2009/0109022 A1 | 4/2009 | Gangopadhyay et al. | |
| 2014/0207277 A1* | 7/2014 | Broome | G06O 20/32 700/237 |
| 2016/0232725 A1* | 8/2016 | Plowman | G06Q 50/30 |

OTHER PUBLICATIONS

Wolfgang et al., "Context-Aware recommender systems in mobile scenarios," International Journal of Information Technology and Web Engineering, Jan. 1, 2009.*

* cited by examiner

*Primary Examiner* — Brandy A Zukanovich
(74) *Attorney, Agent, or Firm* — Haynes and Boone, LLP

(57) ABSTRACT

Systems and methods for providing information to aid users make fuel purchasing decisions and facilitating fuel purchases at fuel providers. A user checks-in to a vehicle with a user account. The user is provided with recommended fuel provider locations based on information such as vehicle information, user account information, traffic information, user information, traffic information, fuel provider information, etc. User checks-in to a fuel provider location based on a connection to a device at the fuel provider location. A payment provider may receive a fuel purchase request authorizing a payment from the user account and processes the payment.

20 Claims, 7 Drawing Sheets

INTELLIGENT FUEL PURCHASING RECOMMENDATIONS

TECHNICAL FIELD

The present invention generally relates to purchasing fuel, and more particularly to providing information to users and facilitating fuel purchases at fuel providers.

BACKGROUND

A connected car contains an in-vehicle system, such as an infotainment system, comprising one or more onboard components and/or modules that connect to other devices within the vehicle and/or devices and servers outside the vehicle. For example, the devices that the in-vehicle system may connect to include a mobile device (e.g., smart phone, PC, computing tablet, wearable computing device, etc.) for a user within the vehicle and external devices or servers for fuel providers.

Many drivers use a device with Global Positioning System (GPS) and navigation capabilities, such as an onboard GPS/navigation system or a mobile device, that determines a current location of a vehicle, receives traffic information, and routes the vehicle to a destination. The GPS/navigation device may search for alternative routes to a destination and select an optimal route based on traffic information. Further, some GPS/navigation devices search for fuel stations within a given proximity of the current location of the vehicle. However, payment for fuel remains conventional and requires a driver to either provide cash or a payment card to complete the transaction. This can potentially be time consuming for the driver and requires the driver to have a payment instrument on hand. Further, the user's experience of the route guidance by the GPS/navigation system, the process of purchasing gas, and the in-vehicle system remain separate and modular experiences.

Figure 1:
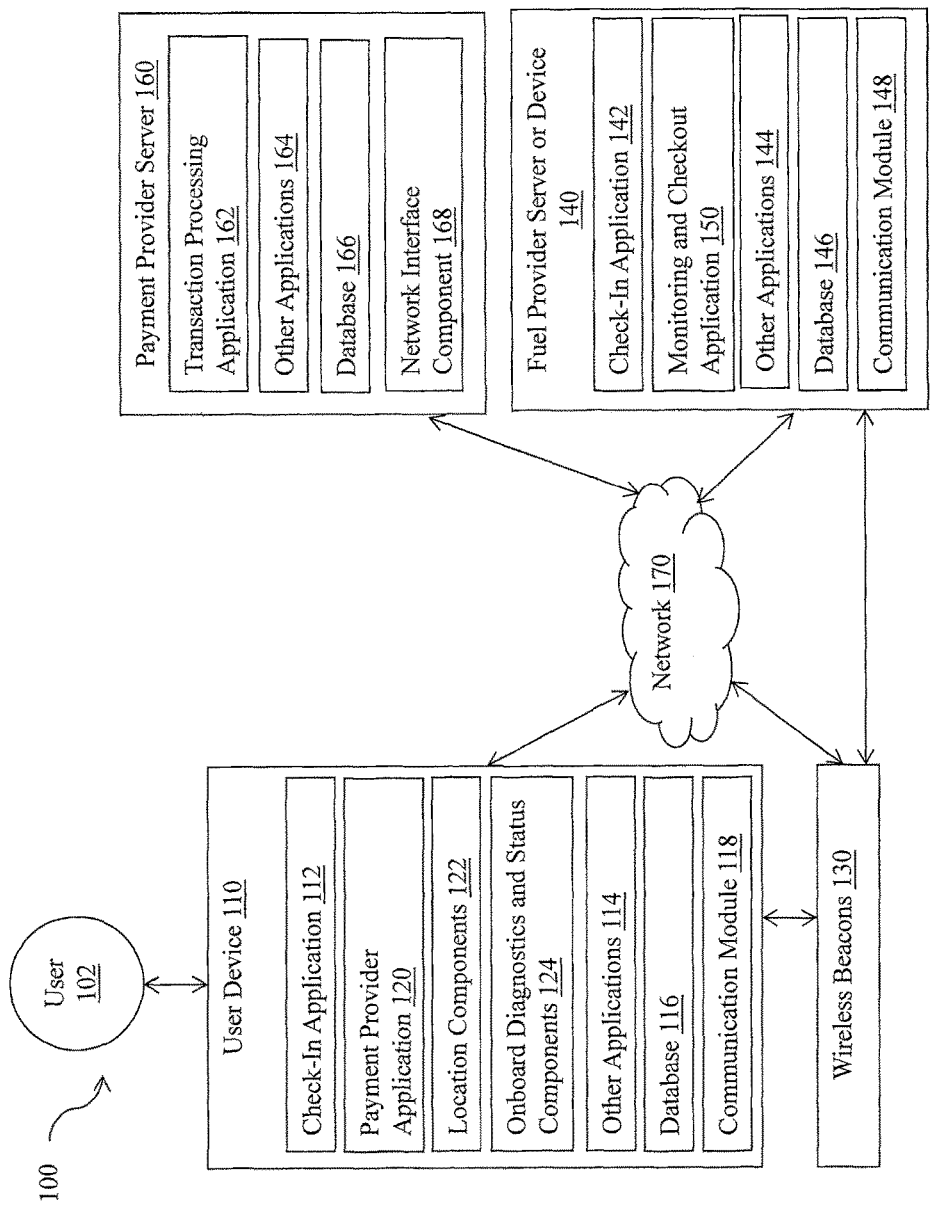
FIG. 1 is a block diagram illustrating a system for providing information to users and purchasing fuel at fuel providers according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for providing information to users to aid users make fuel purchasing decisions, and for purchasing fuel at fuel providers. Systems suitable for practicing methods of the present disclosure are also provided.

In various embodiments, a user can check in to a vehicle (such as via BLE or LTE Direct) through an onboard application with a user account. The vehicle may be a connected car that contains an in-vehicle system, such as an infotainment system. The vehicle is configured to connect to other devices within the vehicle and/or devices and servers outside the vehicle. The vehicle may also be able to communicate with other vehicles. The vehicle may be a conventionally driven car, or feature autonomous and/or automatic driving. The user account may be an account maintained by a payment service provider, such as PAYPAL®, Inc. of San Jose, Calif., USA. The account maintained by the payment provider server may be a funded account that a user can use to make payments. The onboard application is on a user device, which may comprise an in-vehicle system and/or a mobile device (e.g., smart phone, PC, computing tablet, etc.). The onboard application may have access to the onboard GPS/navigation system and the onboard system diagnostics and status, which monitors vehicle information such as fuel level, fuel consumption rate, etc. The onboard application may be an application of a payment service provider, such as PAYPAL®, or an application of a third-party service provider that is compatible with the services of the payment service provider.

In an embodiment, a user may check in to a vehicle using one or more methods of vehicle check-in. The user may check in to a vehicle by a connection between a mobile device and an in-vehicle system. The user may check-in by entering login information on the Graphic User Interface (GUI) of the vehicle. The login may be an account ID, email, phone number, etc. The user may check-in using biometrics, such as the user's fingerprint or voice, through a preconfigured biometric sensor integrated with the vehicle. The user may check-in by the user's weight measured on a weight sensor on the seat of the vehicle that is preconfigured to recognize the weight of several users, such as people in the same household who drive. Various other check-in methods may be implemented.

In an embodiment, an onboard application integrates with a GPS/navigation system to display fuel providers and convenience stores, and to provide directions. Fuel providers include gas stations, charging stations, or any other fuel dispensing stations. Fuels provided by the fuel providers include gasoline, diesel fuel, ethanol fuel, E85 fuel, hydrogen fuel, natural gas, electricity, etc. The onboard application integrated with the GPS/navigation system may display fuel providers that accept payments through a payment service provider with a symbol or an icon for the payment service provider.

The onboard application may monitor fuel usage, user schedule, traffic conditions, fuel prices, and desired end point of a trip, and select a fuel provider to fill up at based upon user settings, fuel usage, and timing. The onboard application may suggest fuel providers that accept payments through the payment service provider. A user may select a fuel provider displayed on the map or select a recommended fuel provider.

The onboard application may recommend when and where to fuel based on vehicle information, user information, user account information, traffic information, fuel provider information, physical route information, etc. Vehicle information includes a location of the user's vehicle, current fuel levels, and current fuel consumption rate. User information includes trip destinations, user's schedule and any other user provided information. User account information includes user settings, e.g., user preferences, which may be set to fuel at a certain fuel level, optimize for minimal travel time, optimize for minimal cost, or dynamically adapt to user's schedule/destination. User settings may also include preferences for a fuel provider brand, or a requirement for a certain type of fuel. Fuel provider information includes the fuel cost at fuel providers, types of fuel provided, and wait times at fuel providers. Traffic information may include predicted future traffic information. In an embodiment, the onboard application may take into account all such information and determine a suggested time for the user to fuel, such as by predicting when the user may want to fuel or when it would be convenient for the user to fuel. In some embodiments, the onboard application may optimize a trip for time, cost, etc. based on all such information and the vehicle's need to refuel.

In various embodiments, a vehicle can check in to locations, and thereby check their known passengers into those locations. When a user in a vehicle arrives at a fuel provider, the vehicle communicates with a fuel provider device, such as a beacon. The fuel provider device may be a general communication device for the fuel provider, or may be specific for a fuel pump at the fuel provider. For example, an onboard application may communicate with a beacon at a fuel pump and display the fuel pump number on the GUI of a vehicle for a user to verify.

Fuel providers may provide short range wireless communications with a user device (e.g., an in-vehicle system and/or a mobile device), such as through Bluetooth Low Energy (BLE) beacon communications. These beacons may be set up at a fuel provider location or at each fuel pump, and communicate with user devices. The beacons may provide additional functionality, such as establishing a connection with a server entity to complete transactions, including payment services. The beacons may provide communications to the devices directly, including information stored in the beacons. The beacons may also provide communication with a device attached to, or in communication with, the beacon, such as a device of a fuel provider. The beacons may employ BLE, LTE Direct, or other communication protocols that emit a signal receivable by the user's device. The communication may include an identifier for the beacon, the user, a fuel provider, and/or a payment provider.

The user's vehicle or device may be set up to passively monitor for BLE, LTE Direct, or other communications. When the device detects the signal and verifies the one or more identifiers, both the device and the beacon may ramp up in power and establish a connection, where the connection may further enable the device to communicate with the payment provider or fuel provider. The beacon may be connected to a networked device at the fuel provider location, or the beacon may include network functionality to communicate with other devices and/or servers. Thus, the beacon enables the user's device to establish a connection, communicate check-in information (e.g., an identifier for the user), and/or initiate a check-in with the fuel provider. The cheek-in may be completed automatically when the user's device is in range of the beacon, or may be completed after prompting the user to check-in when the user's device is in range of the beacon.

When the fuel provider establishes a plurality of wireless beacons at each fuel pump at the fuel provider location, the beacons may be set up to connect to the user's vehicle or device at the start/entrance to the fuel provider location and/or at a specific fuel pump. Thus, the fuel provider may monitor which fuel pump the user is using by viewing which beacon the user's vehicle or device is connected to. The wireless beacons may be range limited to correspond to the fuel pump that is monitored by that beacon. This may be done by adjusting the power of the signal emitted by the beacon so that connections to devices outside of a radius surrounding the beacon will not pick up a check-in request and/or connect to the beacon. Additionally, the fuel provider may implement measures to limit the range of the wireless beacon, such as by placing the beacon above the vehicle and utilizing a radiation absorbing matting below the vehicle to limit diffusion of communication signals beyond each fuel pump area. The beacon may similarly be configured to point the communication signals in a specific direction so as to limit connectivity with the beacon to a specific area.

The user and/or vehicle may be assigned a number when the device transmits check-in information to a wireless beacon at the fuel provider location. The number may be associated with a purchase order that the user generates with the fuel provider. In other embodiments, the fuel provider may wait until a purchase order is generated by the user before associating the check-in information and/or identifier in the check-in information with the purchase order.

In various embodiments, an onboard application may determine how much to fill up based on user settings (e.g., user preferences) and vehicle information, and suggest a prepay amount to the user. The user settings may be set on the onboard application, and may include settings such as always fill to the max, fill to a predetermined fuel level (e.g., half tank), fill for a predetermined period of time (e.g., 5 min), spend a predetermined amount (e.g., $20), etc. The user may confirm the suggested prepay amount, select another amount, or fill the tank. The user may set a predetermined authorization amount or a maximum. For example, the maximum amount that can be paid with a user account may be set at $100. The fuel provider device communicates with the payment service provider. The onboard application and/or the payment service provider may prepay the fuel provider for fuel. The onboard application may say "ready to fuel." The symbol or icon of the payment service provider may appear on a fuel pump.

The vehicle may then be fueled (e.g., with gasoline, diesel fuel, etc.) and/or charged (e.g. electricity, etc.). In one embodiment, the user may put fuel into the vehicle by conventional procedure. Typically, conventional procedure comprises the user opening a fuel door, removing a fuel cap, inserting a fuel hose, and putting in fuel. In other embodiments, the vehicle is fueled and/or charged by an automated procedure. For example, a robotic arm may open the fuel door, remove the cap, insert the fuel hose, and put fuel into the vehicle. In another example, an electric car may be charged by an automated recharging facility.

In some embodiments, the user settings may be set for a user, for a vehicle, or both. The user may set the user settings to personalize the settings based on the vehicle, based on the user, or both. When both user-specific user settings and vehicle-specific user settings exist, one may take precedence. For example, the vehicle owner's settings for the vehicle may take precedence over user settings of a driver who is not the owner.

In one embodiment, a user may check in to a vehicle with a PAYPAL® account through a PAYPAL® onboard application. The PAYPAL® onboard application integrates with the GPS/navigation system to display gas stations that accept payment through PAYPAL® and display those gas stations with a PAYPAL® symbol or icon on the map. The PAYPAL® onboard application integrates with the onboard diagnostics and status components of the vehicle to access vehicle information, such as fuel level and fuel consumption rate. The user may set user settings, e.g. user preferences, for the vehicle or for the user. The PAYPAL® onboard application suggests locations of fuel providers and timing of fueling based on the vehicle information, user settings, and other user information that is synced to the PAYPAL® onboard application. When the PAYPAL® onboard application suggests gas stations that accept PAYPAL®, the user may select one of those gas stations. The PAYPAL® onboard application integrates with the GPS/navigation to provide route guidance to the gas station. When the user arrives at a gas station, the vehicle connects to a gas station device, which may be specific for each gas pump. The PAYPAL® onboard application suggests a prepay amount based on user settings and vehicle information. The user selects and/or confirms the amount of fuel to be purchased and the fuel pump number. The PAYPAL® onboard application communicates the prepay amount to the gas station device. The PAYPAL® onboard application and/or the gas station may transmit a fuel purchase request to the PAYPAL® payment server. The PAYPAL® payment server processes the payment from the user's PAYPAL® account to the gas station.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, wireless beacons 130, a fuel provider server or device 140, and payment provider server 160 in communication over a network 170. User 102, such as a consumer or other potential payor, may arrive at a fuel provider location (e.g., a fuel station, charging station, etc.) of a fuel provider. User device 110 may establish a connection with one or more of wireless beacons 130 at the fuel provider location. The fuel provider may then monitor the fuel pump to be used by user 102 using connections between user device 110 and wireless beacons 130. Additionally, payment provider server 160 may provide payment services between user device 110 and fuel provider device 140.

User device 110, wireless beacons 130, fuel provider device 140, and payment provider server 160 may each include one or more processors, memories, and other appropriate components for executing instructions, such as program code, and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

User device 110 may be implemented using any appropriate hardware and software configured for wired and/or wireless communication with wireless beacons 130, fuel provider device 140, and/or payment provider server 160. For example, in various embodiments, user device 110 may be implemented as an in-vehicle system, an onboard infotainment system, an onboard device, and/or other types of computing devices integrated with a vehicle capable of transmitting and/or receiving data. In an embodiment, user device 110 may be implemented as a mobile device such as a personal computer (PC), a smart phone, laptop computer, wristwatch with appropriate computer hardware resources, eyeglasses with appropriate computer hardware (e.g., GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

In various embodiments, user 102 has two user devices that wirelessly connect, so that user device 110 operates as a single unit but is composed of the two processing devices. A first processing device, which is a mobile device, is configured to connect to a second processing device, which is an in-vehicle system. When user 102 carries the first processing device, the mobile device, onto a vehicle equipped with the second processing device, the in-vehicle system, the first processing device and the second processing device connect wirelessly and operate as a single unit. The in-vehicle system may access information and data stored on the mobile device, and vice versa.

User device 110 of FIG. 1 contains a check-in application 112, a payment provider application 120, location components 122, onboard diagnostics and status components 124, other applications 114, a database 116, and a communication module 118. Check-in application 112, payment provider application 120, and other applications 114 may correspond to processes, procedures, and/or applications executable by a hardware processor, for example, a software program. In other embodiments, user device 110 may include additional or different software as required.

Check-in application 112 may be used by user 102 of user device 110 to establish a connection with one or more of wireless beacons 130, including a check-in with the fuel provider. Check-in application 112 may correspond to a specific application utilized by user device 110 with fuel provider device 140 to complete a check-in for a location corresponding to wireless beacons 130. The check-in with fuel provider device 140 may correspond to a process to log in to a user account of user 102 with fuel provider device 140 (or payment provider server 160 if payment provider server 160 provides check-in services). In other embodiments, the check-in may provide and/or verify the identity of user 102, including transmission of an identifier for user 102 and/or user device 110. The check-in may be completed over network 170 with fuel provider device 140. In such embodiments, check-in application 112 may correspond more generally to a browser application configured to communicate with fuel provider device 140.

Check-in application 112 may further be used by user 102 of user device 110 to establish a connection with another user device. For example, user 102 may want to check in to a first user device comprising an in-vehicle system, with a second user device comprising a mobile device, such as a smartphone. Check-in application 112 may check-in a user based on a connection between the mobile device and the in-vehicle system.

Check-in application 112 may correspond to two applications, a first application on a first processing device, a mobile device, and a second application on a second processing device, an in-vehicle system of a vehicle. Check-in application may be used by user 102 of user device 110 to establish a connection between the first processing device and the second processing device, including a check-in to the vehicle. The check-in to the vehicle may correspond to a process to log in to a user account of user 102 with in-vehicle system (or payment provider server 160 if payment provider server 160 provides check-in services). The check-in to the vehicle may be automatically performed when user 102 carrying the mobile device enters the vehicle with the in-vehicle system based on the wireless connection between the two processing devices.

Check-in application 112 may also receive short range wireless communications from wireless beacons 130 at a location and transmit information to wireless beacons 130, including check-in information for a check-in process with fuel provider device 140 (or payment provider server 160 if payment provider server 160 provides check-in services) that associates user 102 with the location corresponding to wireless beacons 130. For example, the location for wireless beacons 130 may correspond to a fuel pump at the fuel provider location where wireless beacons 130 is set up to communicate with user device 110 when user device 110 is in front of a specific fuel pump. In such an example, wireless beacons 130 may be range limited to correspond only to a specific area in front of the fuel pump, and a plurality of other beacons may be distributed throughout the fuel provider location, each capable of uniquely connecting to user device 110. Wireless beacons 130 may be set to be range limited, or may be limited to the room by virtue of walls, the structure of wireless beacons 130 (e.g., a directional configuration for wireless signals based on the physical dimensions of wireless beacons 130), radiation absorptive material in the drive through, or other barriers that prevent transmission of communications to user device 110 when user device 110 is not located at the part of the drive through corresponding to the specific wireless beacon, as will be explained in more detail herein. Thus, check-in application 112 may transmit information to one or more of wireless beacons 130 when user 102 is nearby the one or more of wireless beacons 130, e.g., at the entrance of the fuel provider location, at a fuel pump, at a drive-through car wash, etc., enabling fuel provider device 140 to determine the position of user 102 within the fuel provider location.

Check-in application 112 may execute in the background of an operating system of user device 110 and be configured to establish connections, using communication module 118 of user device 110, with one or more of wireless beacons 130. The connection may be established with or without user input from user 102. For example, wireless beacons 130 may broadcast a token, such as a universally unique identifier (UUID), for reception by check-in application 112, as will be explained in more detail herein. Check-in application 112 may utilize communication module 118 of user device 110 to receive the token from wireless beacons 130. If check-in application 112 acknowledges the UUID as identifying wireless beacons 130, fuel provider device 140, and/or payment provider server 160 (e.g., if check-in application 112 determines the UUID corresponds to a request to complete a check-in), check-in application 112 may transmit an identifier corresponding to user 102 and/or user device 110 back to wireless beacons 130. Check-in application 112 may utilize communication module 118 of user device 110 to communicate with wireless beacons 130 (e.g., over near field communication, Bluetooth, Bluetooth Low Energy, radio, infrared, LTE Direct, or other connection). The identifier from user device 110 may include, be transmitted with, concatenated with, or otherwise bundled with the identifier received from wireless beacons 130. In other embodiments, different information may be transmitted to wireless beacons 130, such as an identifier for user 102, a name or other personal information for user 102, and/or information for the vehicle of user 102 (e.g., a license number, unique identifier, model, color, etc.). Thus, the information transmitted to wireless beacons 130 does not need to be utilized to process and/or complete a check-in with fuel provider device 140 in all embodiments.

Once a connection is established with wireless beacons 130, user device 110 may be checked-in with fuel provider device 140 if user 102 has not previously been checked-in. The check-in process may then associate user 102 with the one or more of wireless beacons 130 used to connect to user device 110. For example, the fuel provider may previously have registered wireless beacons 130 as located in a specific area of the fuel provider location (e.g., at the entrance or a fuel pump of the fuel provider location). Thus, the fuel provider is informed that user 102 and the vehicle for user 102 are at the specific area because user device 110 connects to the one or more wireless beacons 130 for that area. In other embodiments, a check-in need not be processed and/or completed to associate user 102 with the area of the fuel provider location. Thus, other connections and data transfers to the one or more wireless beacons 130 at the specific area may be sufficient to associate user 102 with the specific area.

Payment provider application 120 may be an onboard application on the in-vehicle system of a vehicle, or an application on a mobile device. Payment provider application 120 may be used, for example, to provide a convenient interface to permit user 102 to select payment options and provide payment for fuel and other items and/or services. For example, payment provider application 120 may be implemented as an application having a user interface enabling the user to enter payment options for storage by user device 140, provide payment to the fuel provider, and complete a transaction for the fuel and other items and/or services using payment provider server 160. In certain embodiments, payment provider application 120 may correspond more generally to a web browser configured to view information available over the Internet or access a website corresponding to a payment provider.

Payment provider application 120 may be configured to provide payment to the fuel provider. In this regard, payment provider application 120 may correspond to an application that may provide an interface where user 102 may view a purchase order for fuel and other items requested by user 102. Additionally, user 102 may generate a payment request for the purchase order to the fuel provider. The payment request may instruct payment provider server 160 to provide payment for the purchase order to the fuel provider. Additionally, the payment request may denote a payment instrument that payment provider server 160 may utilize to provide the payment to the fuel provider. Payment provider application 120 may correspond to a dedicated application for payment provider server 160 (e.g., a specific device application) or may correspond to a browser application.

The payment request may correspond to a token including the selected payment instrument for user 102. The payment instrument may include an account identifier, payment card, bank account, etc. Once the payment request is generated, user 102 may authorize the payment request for transmission to payment provider server 160 in order to effectuate a payment to the fuel provider. User device 110 may transmit the payment request to payment provider server 160 with an identifier for the fuel provider in order to complete the payment to the fuel provider. In other embodiments, payment provider application 120 may transmit the payment request as a token with a payment instrument and identifier for user 102 to the fuel provider device 140 for completion by the fuel provider.

Payment provider application 120 may provide payment for fuel and other items using a user account with the payment provider, such as payment provider server 160. Payment provider application 120 may include cross-linking, allowing user 102 to identify a user account through an identifier for a separate user account (e.g., identifying a user account through a debit card account number and vice versa). Payment provider application 120 may further include options to store transaction histories for purchased fuel and other items, such as receipts, for later use. Thus, payment provider application 120 provides an interface enabling user 102 to provide proof of purchase to the fuel provider.

Payment provider application 120 may be configured to determine fuel provider locations to suggest to user 102. Payment provider application 120 may access vehicle information through location components 122 and onboard diagnostics and status components 124. Payment provider application 120 may store user information, including user settings, on database 116 of user device 110. Payment provider application 120 may also receive fuel provider information, such as fuel cost, from fuel provider server 140. Payment provider application 120 may determine recommended fuel provider locations based on the vehicle information, the user information, and the fuel provider information.

In various embodiments, one or more features of check-in application 112 and/or payment provider application 120 may be incorporated in the same application so as to provide their respective features in one application.

User device 110 includes location components 122 (e.g., a global positioning system (GPS) component, navigation component, one or more accelerometers, a compass, Wi-Fi devices, Near-Field Communication (NFC) devices, etc.). Location components 122 may be onboard a vehicle as part of an in-vehicle system and/or on a mobile device. Payment provider application 120 may receive device location information and/or device orientation information from location components 122. The location information may include GPS coordinates, accelerometer data that indicates an orientation of user device 110 and/or movement of user device 110 or other data that indicates the location, position, and/or orientation of user device 110. User device 110 may determine a current location of user device 110 based on the collected location data. In another embodiment, user device 110 may send the location data to payment provider server 160 and payment provider server 160 may determine a current location of user device 110 based on the location data.

User device 110 may include onboard diagnostics and status components 124 on a vehicle as part of an in-vehicle system. Onboard diagnostics and status components 124 comprises onboard sensors that detect and/or monitor fuel level, fuel consumption rate, fluid levels, tire pressures, and other vehicle information. Payment provider application 120 may receive vehicle information from the onboard diagnostics and status components 124. User device 110 may send the vehicle information to payment provider server 160 and payment provider server 160 may use the vehicle information when recommending fuel provider locations.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications associated with payment provider server 160. Other applications 114 may include browser, social networking, and/or mapping applications, which may also be used in conjunction with check-in application 112 and/or payment provider application 120. Other applications 114 may contain software programs, executable by a processor, including a graphical user interface (GUT) configured to provide an interface to the user.

User device 110 may further include database 116 which may include, for example, identifiers such as operating system registry entries, cookies associated with check-in application 112, payment provider application 120, and/or other applications 114, identifiers associated with hardware of user device 110, or other appropriate identifiers, such as identifiers used for payment/user/device authentication or identification. Identifiers in database 116 may be used by a payment/credit provider, such as payment provider server 160, to associate user device 110 with a particular account maintained by the payment/credit provider. Database 116 may include user device tokens and/or encryption keys, including an encryption key of wireless beacons 130, fuel provider device 140, and/or payment provider server 160. Database 116 may include identifying information for tokens enabling check-in application 112 to identify wireless beacons 130, fuel provider device 140, and/or payment provider server 160 when receiving a corresponding check-in token.

User device 110 includes at least one communication module 118 adapted to communicate with wireless beacons 130, fuel provider device 140, and/or payment provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacons 130 using short range communications, such as Bluetooth Low Energy, LTE Direct, radio frequency, infrared, Bluetooth, and near field communications.

Wireless beacons 130 may be maintained, for example, by the fuel provider and/or payment provider server 160. Wireless beacons 130 may be implemented using any appropriate hardware and software configured for wireless communication with user device 110. For example, in one embodiment, one or more of wireless beacons 130 may be implemented as a dongle device including a hardware processor and a communication module, for example, connected to device at the fuel provider location. Wireless beacons 130 may also be implemented as devices incorporated within a personal computer (PC), a smart phone, laptop computer, and/or other types of computing devices capable of transmitting and/or receiving data, such as an IPAD® from APPLE®. Wireless beacons 130 may also act as stand-alone devices including a processor, communication module, and/or network interface component configured to communicate with user device 110 and/or payment provider server 160. Although wireless beacons 130 are described as a plurality of wireless beacons set up at the fuel provider locations, in various embodiments, wireless beacons 130 may correspond to a single wireless beacon established at one fuel provider location, such as a fuel pump, car wash, entrance, etc.

Wireless beacons 130 may be located at a physical location corresponding to the fuel provider. A physical location corresponding to the fuel provider may constitute, for example, a fuel provider location and/or a fuel pump. Each of wireless beacons 130 may be established in a specific area of the fuel provider location and limited, either by signal range or physical boundaries, to a specific fuel pump or area in the fuel provider location. For example, one of wireless beacons 130 may be established at the entrance to the fuel provider location, at each fuel pump, and at a drive-through carwash. Wireless beacons 130 of FIG. 1 contains processes, procedures, and/or applications executable by a hardware processor, for example, a software program, configured to interact with user device 110, fuel provider device 140, and/or payment provider server 160. Thus, regardless of the implementation of wireless beacons 130 as discussed above, each of wireless beacons 130 may utilize a check-in process and include or be connected to a communication module. In other embodiments, wireless beacons 130 may include additional or different software and devices as required.

Each of wireless beacons 130 may include an application for transmitting requests to establish a connection between a device (e.g., user device 110) and one of wireless beacons 130. The requests may be unique to each of wireless beacons 130 and form a connection with only the matching one of wireless beacons 130. Thus, wireless beacons 130 may utilize short range wireless communications of wireless beacons 130 to transmit the requests to establish a connection, including an identifier such as a Universally Unique Identifier (UUID). If user device 110 receives a request to establish the connection with wireless beacons 130 and responds with an identifier for user 102/user device 110 (potentially including the UUID and other information necessary to effectuate a check-in for user 102), wireless beacons 130 to ramp up in power and create a connection between user device 110 and one of wireless beacons 130.

Each of wireless beacons 130 may uniquely transmit the request to establish the connection with wireless beacons 130 as a short range wireless communication (e.g., a BLE protocol communication) including a "wake up" process for check-in application 112 of user device 110 and/or a token for the one of wireless beacons 130 transmitting the request. In other embodiments, the request and/or connection may utilize near field communication, radio communication, infrared communication, or Bluetooth communication. Additionally, although wireless beacons 130 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacons 130 (e.g., user device 110 and/or fuel provider device 140) and establishment of a connection for data transfers The request may be specific to user device 110 by including information that is specific to user 102, such as a name, identifier, or user device identifier. The information specific to user 102 may be determined from a user account of user 102 or other information previously provided to fuel provider device 140 and/or payment provider server 160. Thus, in certain embodiments, only user device 110 will pick up and authenticate the request. In other embodiments, user device 110 may only pick up the request based on the signal range and/or physical context for one of wireless beacons 130 transmitting the request. For example, one of wireless beacons 130 established at a fuel pump may be limited in range only to connect to user device 110 if user device 110 is located in proximity to that fuel pump.

After one of wireless beacons 130 receives an identifier from user device 110, the one of wireless beacons 130 may determine user 102 is in proximity to itself. Thus, the one of wireless beacons 130 receiving the identifier may pass the identifier to fuel provider device 140 and/or payment provider server 160 to associate user 102 (and thus user device 110 and a vehicle user 102 is traveling in) with the particular one of wireless beacons 130 that received the identifier. By associating user 102 with the particular one of wireless beacons 130 receiving the identifier, fuel provider device 140 and/or payment provider server 160 may determine a location for user 102 at the fuel provider location, such as the fuel pump at which user 102 is located. Wireless beacons 130 may utilize a communication module to pass the identifier to fuel provider device 140, which may then pass the identifier to payment provider server 160. However, in other embodiments, wireless beacons 130 may utilize a network connection of wireless beacons 130 to pass the identifier to payment provider server 160 directly. Thus, each of wireless beacons 130 includes a communication module adapted to communicate with user device 110, fuel provider device 140, and/or payment provider server 160. The communication module may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. The communication module may communicate with user device 110 and/or fuel provider device 140 using short range communications, such as Bluetooth Low Energy, LTE Direct, radio frequency, infrared, Bluetooth, and near field communications.

Fuel provider server or device 140 may be implemented using any appropriate hardware and software configured for wired and/or wireless communication with user device 110, wireless beacons 130, and/or payment provider server 160. For example, fuel provider device 140 may be implemented as a personal computer (PC), server computing device, networked devices, a smart phone, laptop computer, wristwatch with appropriate computer hardware resources, eyeglasses with appropriate computer hardware (e.g., GOOGLE GLASS®) and/or other types of computing devices capable of transmitting and/or receiving data, such as an IPAD® from APPLE®. Although a fuel provider device is shown, the fuel provider device may be managed or controlled by any suitable processing device. Although only one fuel provider device is shown, a plurality of fuel provider devices may function similarly. Moreover, in various embodiments, one or more of the applications, processes, and/or features discussed below in reference to fuel provider device 140 may be included in payment provider server 160, and vice versa.

Fuel provider server or device 140 of FIG. 1 contains a check-in application 142, a monitoring and checkout application 150, other applications 144, a database 146, and a communication module 148. Check-in application 142, monitoring and checkout application 150, and other applications 144 may correspond to processes, procedures, and/or applications executable by a hardware processor, for example, a software program. In other embodiments, fuel provider device 140 may include additional or different software as required.

Check-in application 142 may correspond to processes to complete check-in with user device 110 for a location corresponding to the fuel provider (e.g., with one or more of wireless beacons 130 established at the fuel provider location for the fuel provider). Thus, check-in application 142 may correspond to the fuel provider device side application configured to receive check-in information from user device 110 and complete the check-in. The check-in request may include log in information for a user account with the fuel provider and/or payment provider server 160 and thus complete the check-in with user 102 by verifying the account information. For example, the check-in information may include an identifier or other account information for a user/payment account of user 102. However, in embodiments where a user account has not been previously established by user 102, check-in application 142 may receive other information identifying user 102 and/or the fuel provider, including a user name/identifier, user device identifier, an identifier for an account with another server, or other information. The check-in information may also be utilized to pull up a previous order and complete a transaction for user 102. For example, the check-in information may include an identifier for user 102 that enables fuel provider device 140 to identify a food order, prepaid gas amount, prepaid toll, or other previously established order.

Once check-in is completed between user device 110 and wireless beacons 130, monitoring and checkout application 150 may be utilized to transmit and receive information between user device 110 and fuel provider device 140. Monitoring and checkout application 150 may be used, for example, to provide a convenient interface to permit the fuel provider to view check-in information and/or location information for user 102 at the fuel provider location. In this respect, monitoring and checkout application 150 may receive check-in information, an identifier, or other connection information when user device 110 connects to one or more of wireless beacons 130. As previously discussed, when user device 110 connects to one of wireless beacons 130, user device 110, and thus user 102 and/or any vehicle user 102 is travelling in, is associated with a beacon of wireless beacons 130 that is connected to user device 110. Since the connected beacon is associated with the location, such as an entrance, a fuel pump, convenient store parking, or a drive-through carwash, monitoring and checkout application 150 may determine that user 102 is located at the location for the connected beacon of wireless beacons 130.

Based on the location of user 102 at the fuel provider location, such as a fuel station, monitoring and checkout application 150 may take various actions. In one embodiment, the beacon of wireless beacons 130 that user device 110 connects to is located at an entrance to the fuel provider location. If the fuel provider location has multiple lanes, user 102 may be directed to a lane with the least traffic. The beacon of wireless beacon 130 may also be located at each fuel pump. Thus, the identifier used to connect to one or wireless beacons 130 may be associated with an order submitted by user 102 at the fuel pump. Wireless beacons 130 may actively monitor each lane of fuel pumps to determine which users are at each fuel pump, and monitor the number of vehicles that are waiting for a fuel pump. Thus, monitoring and checkout application 150 may determine or estimate an average wait time in each lane, a traffic flow of each lane, and a best lane for each user as they arrive at the fuel provider.

The fuel provider may process a payment, including a payment by user 102 using payment provider server 160. Monitoring and checkout application 150 may transmit a payment token to user device 110, where the payment token may have the order for user 102 (e.g., an order user 102 utilizes user device 110 to generate) and/or a payment total that the fuel provider generates in response to the order. Monitoring and checkout application 150 may receive confirmation of payment to an account of the fuel provider, such as payment information and transaction histories that complete the payment. In other embodiments, user device 110 may provide the payment instrument and authorization (e.g., an account identifier, payment instrument, and/or token including additional payment information) to fuel provider device 140 for completion by monitoring and checkout application 150 using payment provider server 160.

In another embodiment, user 102 may establish an order with the fuel provider prior to arriving at the fuel provider location. The order may be paid prior to user 102 arriving at the fuel provider location or after fueling at the fuel provider location. In such embodiments, when user device 110 connects to one or more of wireless beacons 130 at the location, the order may be recalled and prepared for user 102. In certain embodiments, the order may be authorized or completed as soon as user 102 connects to one of wireless beacons 130. For example, a beacon of wireless beacons 130 established at a specific fuel pump, an entrance to a car wash, or another site where user 102 is required to pay for authorization to use, may activate the fuel pump (including for a pre-purchased amount), activate and enable access to the car wash, or otherwise permit user 102 to utilize the item/location/service.

Fuel provider server or device 140 includes other applications 144 as may be desired in particular embodiments to provide features to fuel provider device 140. For example, other applications 144 may include security applications for implementing client-side security features, programmatic client applications for interfacing with appropriate application programming interfaces (APIs) over network 170, or other types of applications. Other applications 144 may also include email, texting, voice and IM applications that allow a fuel provider to send and receive emails, calls, texts, and other notifications through network 170. In various embodiments, other applications 144 may include financial applications, such as banking, online payments, money transfer, or other applications associated with payment provider server 160. Other applications 144 may contain other software programs, executable by a processor, including a graphical user interface (GUI) configured to provide an interface to the user.

Fuel provider server or device 140 may further include database 146 which may include, for example, identifiers such as operating system registry entries, cookies associated with check-in application 142, monitoring and checkout application 150, and/or other applications 144, identifiers associated with hardware of fuel provider device 140, or other appropriate identifiers, such as identifiers used for payment/user/device authentication or identification. In one embodiment, identifiers in database 146 may be used by payment provider server 160 to associate fuel provider device 140 with a particular account maintained by payment provider server 160. Database 146 may also store user 102's information, including check-in information, an identifier, etc., for user 102. Database 146 may include orders by user 102 and transaction histories for purchased fuel and other items by user 102 to present proof of purchase.

Fuel provider server or device 140 includes at least one communication module 148 adapted to communicate with user device 110, wireless beacons 130, and/or payment provider server 160. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 148 may communicate directly with wireless beacons 130 using short range communications, such as Bluetooth Low Energy, LTE Direct, radio frequency, infrared, Bluetooth, and near field communications.

Payment provider server 160 may be maintained, for example, by an online payment service provider, which may provide payment services and/or processing for financial transactions on behalf of a user. In this regard, payment provider server 160 includes one or more processing applications which may be configured to interact with user device 110, wireless beacons 130, and/or fuel provider device 140 to facilitate payment for a transaction. In one example, payment provider server 160 may be provided by PAYPAL®, Inc, of San Jose, Calif., USA. However, in other embodiments, payment provider server 160 may be maintained by or include a credit provider, financial services provider, financial data provider, and/or other service provider, which may provide payment services to user 102 and/or fuel provider. Moreover, in various embodiments, one or more of the applications, processes, and/or features discussed below in reference to payment provider server 160 may be included in fuel provider device 140, and vice versa.

Payment provider server 160 of FIG. 1 includes a transaction processing application 162, other applications 164, a database 166, and a network interface component 168. Transaction processing application 162 and other applications 164 may correspond to processes, procedures, and/or applications executable by a hardware processor, for example, a software program. In other embodiments, payment provider server 160 may include additional or different software as required, such as a check-in application and/or a monitoring application as discussed in reference to fuel provider device 140, where those features are instead provided by payment provider server 160.

Transaction processing application 162 may be configured to receive information from and/or transmit information to user device 110 and/or fuel provider device 140 for processing and completion of financial transactions. Transaction processing application 162 may include one or more applications to process financial transaction information from user 102 and fuel provider by receiving a request to complete transaction for fuel and other items and/or services offered by the fuel provider. The request may correspond to a payment from user 102 to the fuel provider. The payment may include a user account identifier or other payment information (e.g., a credit/debit card or checking account) for user 102 and a receiving account for the fuel provider. Additionally, the payment may include a payment amount and terms of payment. Transaction processing application 162 may complete the transaction by providing payment to the fuel provider through the receiving account/payment information. Additionally, transaction processing application 162 may provide transaction histories, including receipts, to user device 110 and/or fuel provider device 140 for completion and documentation of the financial transaction. For example, a transaction history may be provided to user device 110 and/or fuel provider device 140 to allow for the fuel provider to view the transaction and provide the fuel and other items and/or services to user 102.

Payment provider server 160 may be configured to determine recommended fuel provider locations for user 102 and transmit the recommended fuel provider locations to user device 110, such as an in-vehicle system or a mobile device of user 102. Payment provider server 160 may receive vehicle information from location components 122 and onboard diagnostics and status components 124 through payment provider application 120. Payment provider server 160 may store user information, including user settings, on database 166 of payment provider server 160. Payment provider server 160 may also receive fuel provider information, such as fuel cost, from fuel provider server 140. Payment provider server 160 may determine recommended fuel provider locations based on the vehicle information, the user information, and the fuel provider information. Payment provider server 160 may then transmit the recommended fuel provider locations to the in-vehicle system or the mobile device of user 102.

In various embodiments, payment provider server 160 includes other applications 164 as may be desired in particular embodiments to provide features to payment provider server 160. For example, other applications 164 may include security applications for implementing server-side security features, programmatic server applications for interfacing with appropriate application programming interfaces (APIs) over network 170, or other types of applications. Other applications 164 may contain software programs, executable by a processor, including a graphical user interface (GUI), configured to provide an interface to a user.

Additionally, payment provider server 160 includes database 166. As previously discussed, user 102 and/or the fuel provider may establish one or more payment accounts with payment provider server 160. User accounts in database 166 may include fuel provider/user information, such as name, address, birthdate, payment/funding information, additional user financial information, and/or other desired user data. User 102 and/or the fuel provider may link to their respective payment accounts through a user, fuel provider, and/or device identifier. Thus, when an identifier is transmitted to payment provider server 160, for example, from user device 110 and/or fuel provider device 140, a payment account belonging to user 102 and/or the fuel provider may be found. In other embodiments, user 102 and/or the fuel provider may not have previously established a payment account and may provide other financial information to payment provider server 160 to complete financial transactions, as previously discussed.

In various embodiments, payment provider server 160 includes at least one network interface component 168 adapted to communicate user device 110, wireless beacons 130, and/or fuel provider device 140 over network 170. In various embodiments, network interface component 168 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
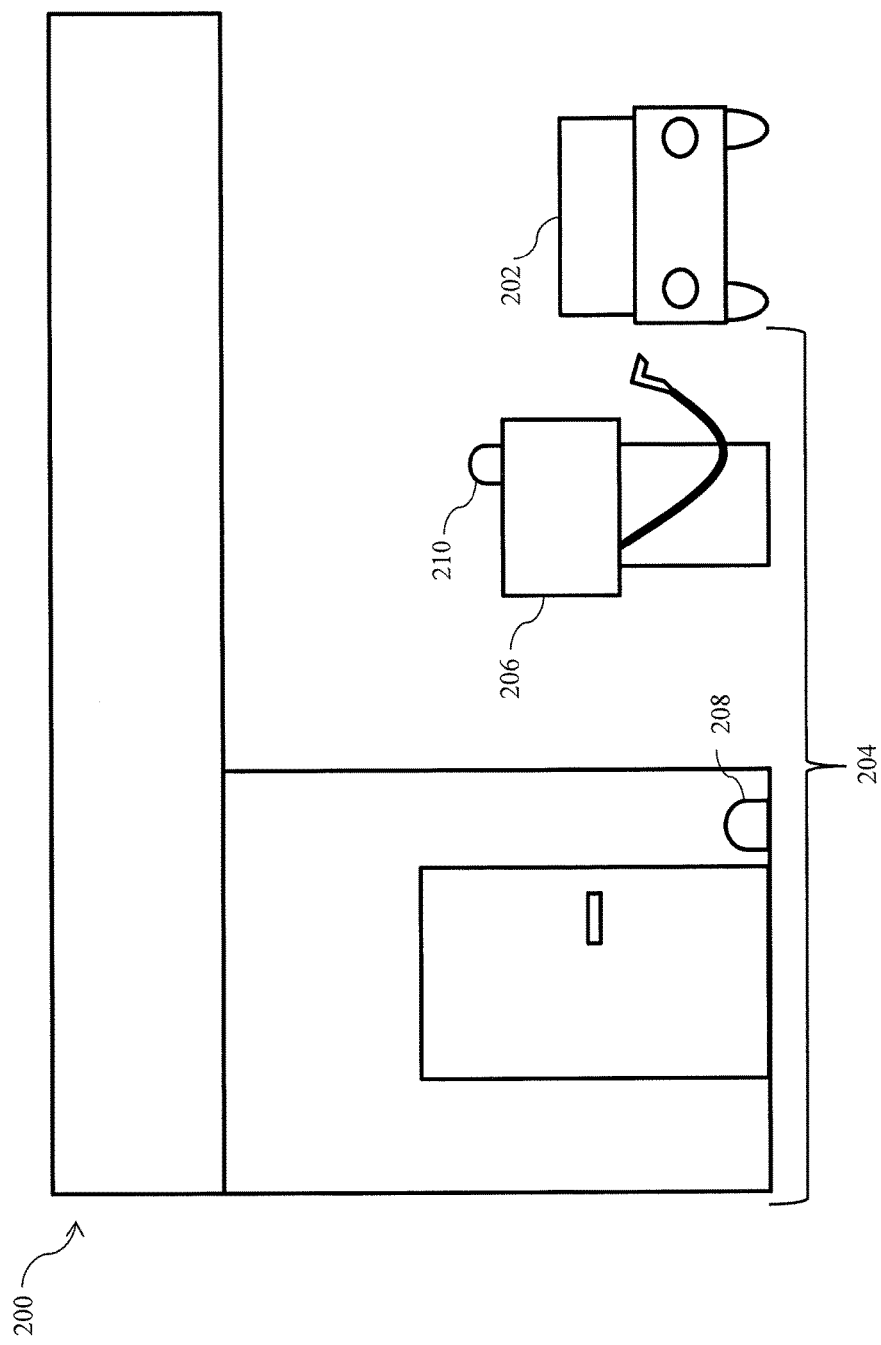
FIG. 2 is an exemplary environment showing a vehicle situated at a fuel provider that uses communication devices to connect to an in-vehicle system or a mobile device according to an embodiment of the present disclosure.

Referring now to FIG. 2, an exemplary environment 200 showing a vehicle 202 situated in front of a fuel pump 206 at a fuel provider location 204 (e.g., a fuel station or a charging station) that uses one or more beacons 208, 210 to connect to user device 110 comprising an in-vehicle system or a mobile device according to an embodiment of the present disclosure. A beacon may be located at fuel provider location 204, i.e., a general fuel provider beacon 208. A beacon may be located at a specific fuel pump, i.e., a fuel pump beacon 210. Both types of beacons 208, 210 may be present at fuel provider location 204. Beacons 208, 210 are implemented in a similar manner as wireless beacons 130 described above.

Figure 3:
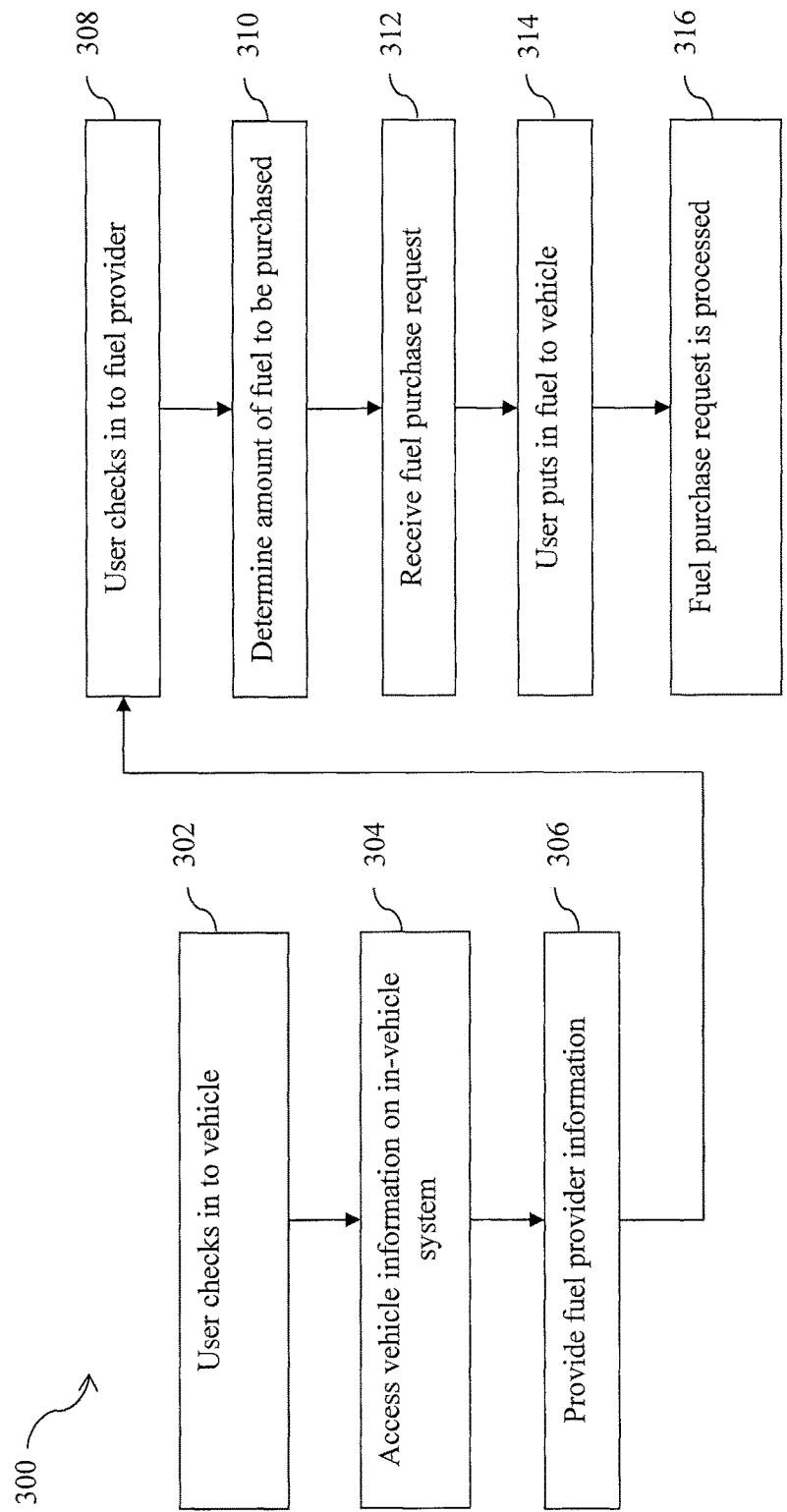
FIG. 3 is a flowchart showing a method for providing fuel provider information to users and purchasing fuel at fuel providers according to an embodiment of the present disclosure.

Referring now to FIG. 3, a flowchart 300 of a method for providing information to user 102 and purchasing fuel at fuel providers is illustrated according to an embodiment of the present disclosure. At step 302, user 102 checks in to vehicle 202. For example, user 102 may check in to vehicle 202 by a mobile device connecting wirelessly to communication module 118 of vehicle 202. In another example, user 102 may check-in by entering login information on the GUI of vehicle 202 or by speaking the login information to an audio input of vehicle 202. In a further example, user 102 may check-in with biometrics of user 102 that is measured by one or more biometric sensors of vehicle 202, such as a fingerprint reader, voice recognition, retinal scan, etc. A user's weight measured by a weight sensor on the seat of vehicle 202 may also be used for check-in. Vehicle 202 may be configured to permit more than one of the above check-in methods. In an embodiment, the available check-in methods are in the alternative, such that user 102 can check-in using any of the available check-in methods. In another embodiment, user 102 is required to use more than one of the available check-in methods. In some embodiments, the check-in method may be a user setting that can be set by user 102.

In an embodiment, a user account for user 102 is identified when user checks in to vehicle 202. For example, when user 102 checks in to vehicle 202 by a mobile device connecting wirelessly to communication module 118 of vehicle 202, the mobile device may also communicate the user account and/or credentials for the user account to communication module 118. The user account may be an account maintained by a payment provider in database 166 of payment provider server 160. User 102 may use payment provider application 120 on the in-vehicle system to check in to vehicle 202 with the user account. The user account may be used to check in to a fuel provider, and make a payment to the fuel provider. Thus, user 102 may check-in with the user account once and subsequent check-ins or verifications of the user account are automatically performed based on the first check-in.

In an embodiment, the check-in comprises the user 102 checking in to payment provider application 120 of the in-vehicle system. The in-vehicle system may access the module or component that is used for the check-in. Based on the check-in, the in-vehicle system may receive credentials for the user account, access a user account, and/or determine that user 102 is in vehicle 202.

In some embodiments, user 102 may check in to vehicle 202 through payment provider application 120 on a mobile device. For example, user 102 may check-in by entering login information for payment provider application 120 on the mobile device. In an embodiment, the check-in is processed by payment provider application 120 on the mobile device. In another embodiment, payment provider server 160 receives user account information and/or check-in information from payment provider application 120 and processes the check-in. In certain embodiments, user 102 may provide vehicle information, such as vehicle make, estimated fuel level, estimated driving distance, etc. on payment provider application 120. User 102 may use the mobile device to check-in when vehicle 202 does not have an in-vehicle system or vehicle 202 corresponds to another user's vehicle.

In various embodiments, the in-vehicle system and/or the mobile device transmits check-in information to payment provider server 160. The check-in information may include user data captured by a module or component, credentials for a user account, and/or user account information. When payment provider server 160 receives the check-in information, the payment provider may determine that user 102 is in vehicle 202 and/or access a user account stored in database 166 of payment provider server 160.

In step 304, vehicle information is accessed through the in-vehicle system, including a location, a fuel level, and a fuel consumption rate of vehicle 202. In an embodiment, the in-vehicle system accesses location information through location components 122. The in-vehicle system, through onboard diagnostics and status components 124, accesses a fuel level sensor for the fuel level, and a fuel consumption rate monitor for the fuel consumption rate. The fuel consumption rate may include an average fuel consumption rate and more specific fuel consumption rates depending on driving conditions and the identity of the driver. Other information, such as maintenance information (e.g., engine oil information, tire pressure information, etc.) may be accessed. In various embodiments, payment provider server 160 accesses the vehicle information through the in-vehicle system. The vehicle information may be transmitted to payment provider server 160. The vehicle information may be stored and updated in database 166 of payment provider server 160.

In step 306, user 102 is provided with fuel provider information. In one embodiment, the fuel provider information may be based on vehicle information, and whether fuel provider location 204 accepts payment from the user account. In various embodiments, the fuel provider information and the timing of when to provide the fuel provider information is based on user information, traffic information, and/or user settings (e.g., user preferences).

In an embodiment, payment provider server 160 determines fuel provider locations 204 to recommend and transmits the recommended fuel provider locations to user device 110, such as the in-vehicle system and/or the mobile device. In some embodiments, the in-vehicle system and/or the mobile device access its location components 122 and determine fuel provider locations 204 to suggest.

In step 308, user 102 checks-in to a fuel provider. In an embodiment, user 102 checks in to a fuel provider by the in-vehicle system connecting to communication module 148 of fuel provider device 140 or wireless beacons 130 at fuel provider location 204. The check-in information may be transmitted from the in-vehicle system and/or fuel provider server or device 140 to payment provider server 160.

In step 310, the amount of fuel to be purchased by user 102 is determined. In an embodiment, user 102 is provided with a prepay amount based on information such as the fuel level, fuel cost, and user settings. User 102 may confirm the prepay amount or enter a different amount to purchase.

In step 312, the fuel purchase request of user 102 is received. In an embodiment, user 102 requests a fuel purchase by inputting an amount of fuel to purchase on an onboard application, such as payment provider application 120. The fuel purchase request may be inputted by the user 102 by confirming a preset prepay amount, selecting a preset payment amount, or entering an amount of fuel or desired fuel level on the GUI of the in-vehicle system or on a mobile device. Payment provider server 160 receives the fuel purchase request from the onboard application. The fuel purchase request authorizes payment from the user account to the fuel provider.

In step 314, vehicle 202 is fueled. For example, user 102 may get out of vehicle 202 and put fuel into vehicle 202. Fuel may be put into vehicle 202 by a fuel provider employee. The fueling process may be automated so that fuel pump 206 automatically fuels the vehicle 202.

In step 316, the payment provider processes the payment from the user account to the fuel provider. In an embodiment, once vehicle 202 is fueled, the onboard application and/or the fuel provider notifies the payment provider that fueling has been completed. The payment may be processed before or after a notification that fueling has completed. In some embodiments, user 102 may receive a confirmation and/or a receipt from the payment provider, the fuel provider, or both.

Figure 4:
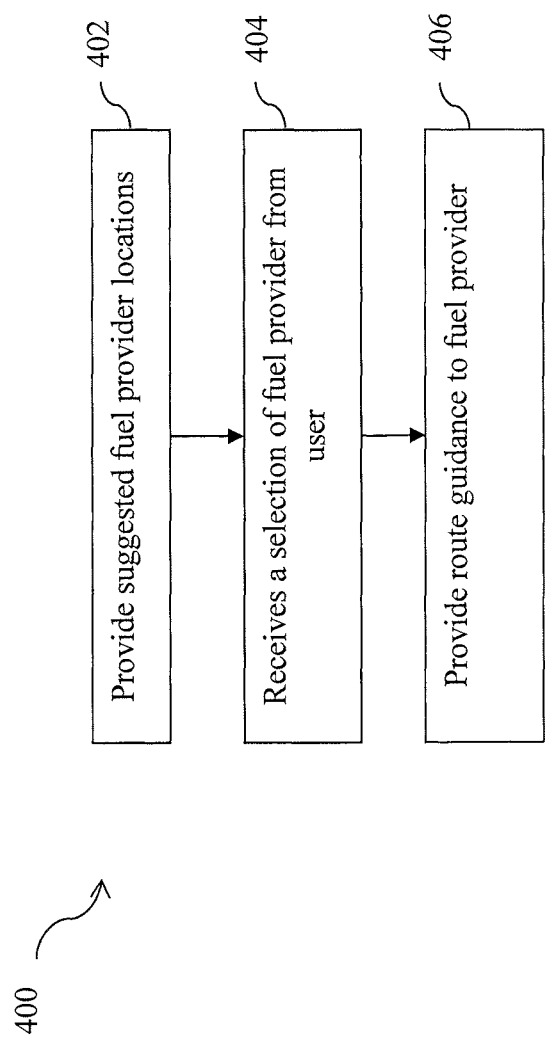
FIG. 4 is a flowchart showing a method for providing fuel provider information according to an embodiment of the present disclosure.

Referring now to FIG. 4, a flowchart 400 of a method for providing fuel provider information is illustrated according to an embodiment of the present disclosure. At step 402, user 102 is provided with fuel provider information, including recommended fuel provider locations. In an embodiment, the onboard application, such as payment provider application 120, recommends to user 102 when and where to stop for fuel. The onboard application selects the recommended fuel provider locations based on information from vehicle 202, user 102, payment provider, service provider, and/or user account information. In another embodiment, payment provider server 160 selects a list of fuel provider locations 204 to recommend to user 102 based on information from vehicle 202, user 102, payment provider, service provider, and/or user account information. Payment provider server 160 transmits the list to the onboard application and/or the mobile device. In various embodiments, the recommended fuel provider locations include ones that accept payment from the payment provider. In some embodiments, the recommended fuel provider locations are limited to ones that accept payment from the payment provider.

In various embodiments, the recommended fuel provider locations and the timing of when to provide the recommended fuel provider locations to user 102 is based on the vehicle information, user information, traffic information, fuel provider information, and/or user settings (e.g., user preferences). The onboard application may dynamically determine a suggested time for the user to fuel based on such information, and provide a notification to user 102 to fuel at the suggested time.

In an embodiment, the recommended fuel provider locations and the timing of when to provide the recommended fuel provider locations to user 102 is based on the vehicle information. The vehicle information is provided by location components 122 and onboard diagnostics and status components 122 of vehicle 202. The vehicle information may include the location, the fuel level, and the fuel consumption rate of the vehicle 202. Using the fuel level and the fuel consumption rate, the driving range may be determined. The recommended fuel provider locations may be selected by searching for fuel provider locations 204 that fall within the driving range from the location of vehicle 202.

In an embodiment, the recommended fuel provider locations and recommended timing of fueling is further based on the user information. The user information is provided by user 102 or the mobile device. The user information may include the user's schedule, such as one maintained on a calendar application, a desired end-point of a trip, and/or predicted schedules/destinations based on the user's driving history and/or driving patterns stored in database 116 of user device 110 or database 166 of payment provider server 160. When recommending a time and a location to get fuel, the onboard application may take into account the user's schedule and traffic conditions, in addition to current fuel levels and current fuel consumption rate. In an example, if user 102 has ⅛ of a tank but has to get to an appointment by 4 p.m., the onboard application may notify user 102 to bypass fueling to make the appointment based on current traffic conditions and current rate of fuel consumption, and recommend user 102 to get fuel after the appointment at a less expensive fuel provider nearby or on the way home.

In an embodiment, the recommended fuel provider locations and recommended timing of fueling is further based on traffic information, including predicted future traffic conditions. The onboard application may access traffic information provided by a traffic information service provider. The traffic information service provider may take into account predicted traffic conditions based on traffic condition history. The onboard application may recommend user 102 to fuel when there is traffic when traffic is predicted to lighten up later, so that user 102 saves time. For example, if user 102 is stuck in traffic, onboard application may determine based on the user's destination and fuel level that user 102 will need to fuel before arriving at the destination, and recommend user 102 to fuel now, as traffic is expected to lighten up later and farther up the route.

In an embodiment, the recommended fuel provider locations and recommended timing of fueling takes into account physical route information (e.g., inclines, swerves, road conditions, etc.), traffic information, and predicted fuel consumption information. Onboard application may recommend the best place on route to fuel or recharge, even though current fuel/electric consumption rate indicates user 102 can reach destination without fueling/recharging. For example, user 102 in an electric vehicle may believe there is sufficient power to get to a destination based on current rate of consumption, but the onboard application may determine that user 102 will need to recharge before reaching the destination because user 102 will be traveling some steep inclines with stop and go traffic.

In an embodiment, the recommended fuel provider locations and recommended timing of fueling is further based on fuel provider information. The fuel provider information is provided by a fuel provider, a payment provider, and/or a service provider. The fuel provider information includes fuel prices (in cost-per-unit of fuel) at each fuel provider and/or wait times at each fuel provider. For example, the payment provider may determine the fuel prices at each fuel provider in real-time by keeping track of how much each user 102 is paying at a given fuel provider location 204, and transmit the fuel price information to the onboard application. In another example, each fuel provider location 204 may transmit the fuel price and/or wait time information to fuel provider server 140 for a fuel provider company (e.g., Shell, Mobile, Chevron, etc.), payment provider server 160, or a service provider. The fuel provider information includes loyalty program information and/or discount information. The fuel provider company may provide the fuel provider information directly to user 102 by transmitting it to the onboard application, or may provide it to the payment provider and/or a service provider. The payment provider or the service provider may then provide the fuel provider information to the onboard application.

In certain embodiments, the recommended fuel provider locations and recommended timing of fueling is takes into consideration user convenience. User 102 may be recommended to fuel even if the fuel level is not low when user will need fuel later, which may be determined by accessing user's schedule, or when fuel provider locations on route will be closed or more expensive. User 102 may be recommended to fuel before there are no fuel providers in route within a driving range given the fuel level. For example, the onboard application or payment provider server 160 may determine that if user 102 does not fuel soon, there will be no fuel provider locations 204 for a long stretch of the route that exceeds the driving range, and accordingly notify user 102 and provide recommended fuel provider locations.

In an embodiment, the user settings, e.g. user preferences, may be set for vehicle 202 or for user 102. The user preferences may include preferences in the timing of fueling. User 102 may prefer to fuel when the fuel level reaches a preset level (e.g., when the fuel level reaches quarter-tank). When the fuel level reaches the preset level, the onboard application may timely provide the recommended fuel provider locations. User 102 may prefer to fuel when it is optimal to minimize cost. For example, user 102 may be willing to go out of the way to a cheaper fuel provider location 204 when cost efficient, and may want to fuel even if there is a lot of fuel remaining when there is an opportunity to put in fuel at a good price. User 102 may prefer to fuel when optimal to minimize travel time. For example, user 102 may want to fuel at fuel provider locations 204 that are on the way to a destination or only allow for short departures from the route to the destination. In another example, user 102 may want to fuel at fuel provider locations 204 that have little or no wait time. In a further example, when user 102 is busy, such as during work hours or weekdays, user 102 may prefer to fuel when optimal to minimize travel time, but when user 102 is less busy, such as in the evenings or weekends, user 102 may prefer to fuel when optimal to minimize cost. In some embodiments, user 102 may select more than one preference and be notified at one point in time that by fueling now user 102 may save fuel cost, and also be notified at another point in time that by fueling then user 102 may save time.

In further embodiments, user 102 may set user preferences relating to fuel provider brand or fuel type as a part of the user preferences. For example, user 102 may prefer a fuel provider brand or require a fuel provider brand. The user may prefer a certain fuel provider brand because the user has a fuel payment card or participates in a rewards program for that brand. The user may store the fuel payment card information or rewards program information as part of user information on database 116 of user device 110 and/or on database 166 of payment provider server 160. The payment provider server 160 may access fuel payment card information or rewards program information when processing payment at the fuel provider brand where such fuel payment card or rewards program is applicable.

In some embodiments, user 102 may set user preferences as to require fueling a certain type of fuel. For example, for vehicle 202 that requires a special type of fuel, the onboard application may only suggest fuel provider locations 204 that have the desired fuel. In further embodiments, the onboard application, such as payment provider application 120, may automatically detect the type of fuel that the vehicle requires. For example, the onboard application may detect that the vehicle is an electric car and only suggest electric charging stations.

In an embodiment, vehicle 202 is a hybrid car that can be charged with electricity and fueled with gas. Based on user preferences, user information (e.g. destination), vehicle information, traffic information, and fuel provider information (e.g. location of charging stations, price of fuel, etc.), the onboard application may recommend a recharge and/or a gas refuel.

In an embodiment, the user may set user preferences to fuel at specific times or days. For example, user 102 may set the user preferences to avoid fueling at a certain day of the week or time period of day. In a further example, user 102 may set the user preferences to avoid fueling when close to an event on the user's schedule on a calendar application that is synced with the onboard application.

In certain embodiments, the fuel provider information includes loyalty program information and/or discount information. The loyalty programs that user 102 participates in and/or available discounts may be stored as part of the user information on database 116 of user device 110 and/or on database 166 of payment provider server 160. In an embodiment, payment provider application 120 may access the user information and provide recommended fuel provider locations together with applicable loyalty programs and discounts. In another embodiment, payment provider application 120 may access the user information and take into account loyalty programs and discounts when suggesting fuel provider locations 204 to user 102. For example, when suggesting fuel provider locations to user 102 who prefers fuel provider locations with lower fuel cost, payment provider application 120 may provide discounted fuel cost based on the loyalty program and discount information. In embodiments in which payment provider server 160 determines the recommended fuel provider locations, payment provider server 160 accesses the loyalty program information and/or discount information.

Thus, user 102 may be provided recommendations of where and/or when to refuel based on one or more of a combination of the above information and factors. Which ones to use may be based on user priorities (such as determined by user 102, the payment provider, and/or the service provider).

At step 404, user 102 selects fuel provider location 204 from the recommended fuel provider locations. In an embodiment, the recommended fuel provider locations are displayed on a GUI of the in-vehicle system. The user 102 selects fuel provider location 204 by user input, such as by clicking on fuel provider location 204 on a touchscreen GUI of the vehicle. In various embodiments, the user's selection is transmitted to payment provider server 160.

At step 406, user 102 is provided route guidance to the selected fuel provider location. In an embodiment, the in-vehicle system provides route guidance using location components 122. In some embodiments, payment provider server 160 determines a route based on the vehicle information, and provides route guidance to the in-vehicle system. In various embodiments, user 102 may select route guidance using location components 122, or use the onboard application that receives route guidance from payment provider server 160 or another service provider.

Figure 5:
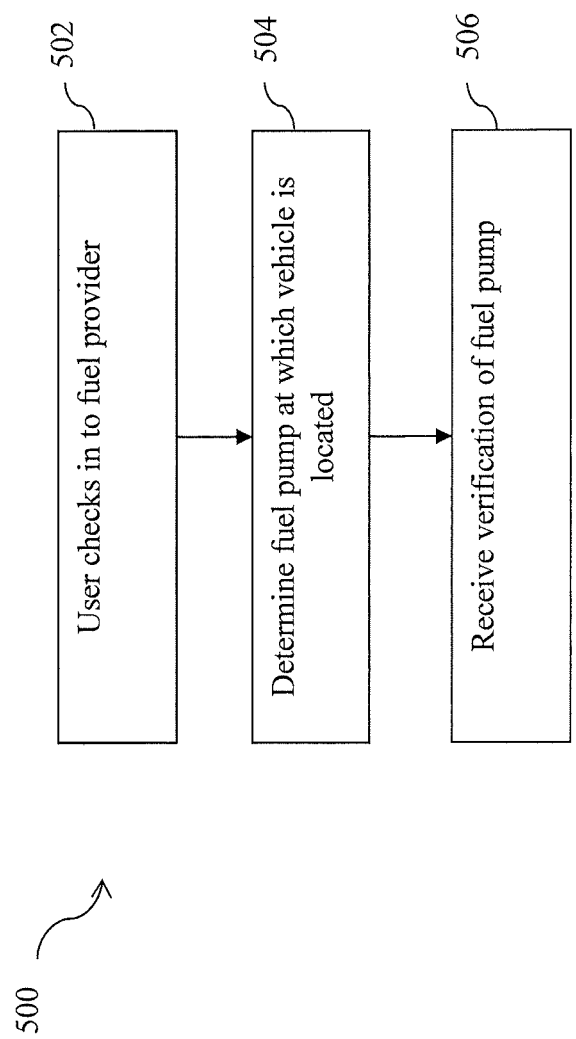
FIG. 5 is a flowchart showing a method for a user checking in to a fuel provider according to an embodiment of the present disclosure.

Referring now to FIG. 5, a flowchart 500 of a method for user 102 checking in to fuel provider location 204 is illustrated according to an embodiment of the present disclosure. At step 502, user 102 checks in to fuel provider location 204. In an embodiment, the user check-in is based on a connection to a device at fuel provider location 204, such as fuel provider device 140 or beacons 130 at fuel provider location 204. For example, the communication module of the in-vehicle system and/or the mobile device may connect to beacon 130 at the fuel provider location 204. Beacon 130 may be for the fuel provider location 204 generally (i.e., general fuel provider beacon 208), or for a specific fuel pump 206 (i.e., fuel pump beacon 210). In another embodiment, user 102 checks in by arriving at fuel provider location 204 based on the location of vehicle 202 given by location components 122 of the in-vehicle system and/or the mobile device. In some embodiments, payment provider server 160 receives check-in information from the in-vehicle system and/or fuel provider server 140.

At step 504, fuel pump 206 at which vehicle 202 is located is determined. In an embodiment, fuel pump 206 is determined by user device 110 connecting to fuel pump beacon 210. Fuel pump beacon 210 may communicate the fuel pump number to the in-vehicle system. Fuel pump beacon 210 and/or the in-vehicle system may communicate the fuel pump number to payment provider server 160. In another embodiment, the fuel provider determines the fuel pump number and communicates it to the in-vehicle system through general fuel provider beacon 208. In some embodiments, user 102 sees the fuel pump number and manually enters the number into the GUI display of the in-vehicle system or the mobile device.

At step 506, the fuel pump number is provided to user 102 for verification. In an embodiment, the number of fuel pump 206 is displayed on the GUI of the in-vehicle system and/or the mobile device, and user 102 can then select to verify the number or enter a different number if the wrong fuel pump has been detected. The in-vehicle system receives verification through the user's input into the GUI. In some embodiments, payment provider server 160 may receive the verification of fuel pump 206 from the in-vehicle system. In cases where user 102 manually entered the fuel pump number, verification may not be necessary.

Figure 6:
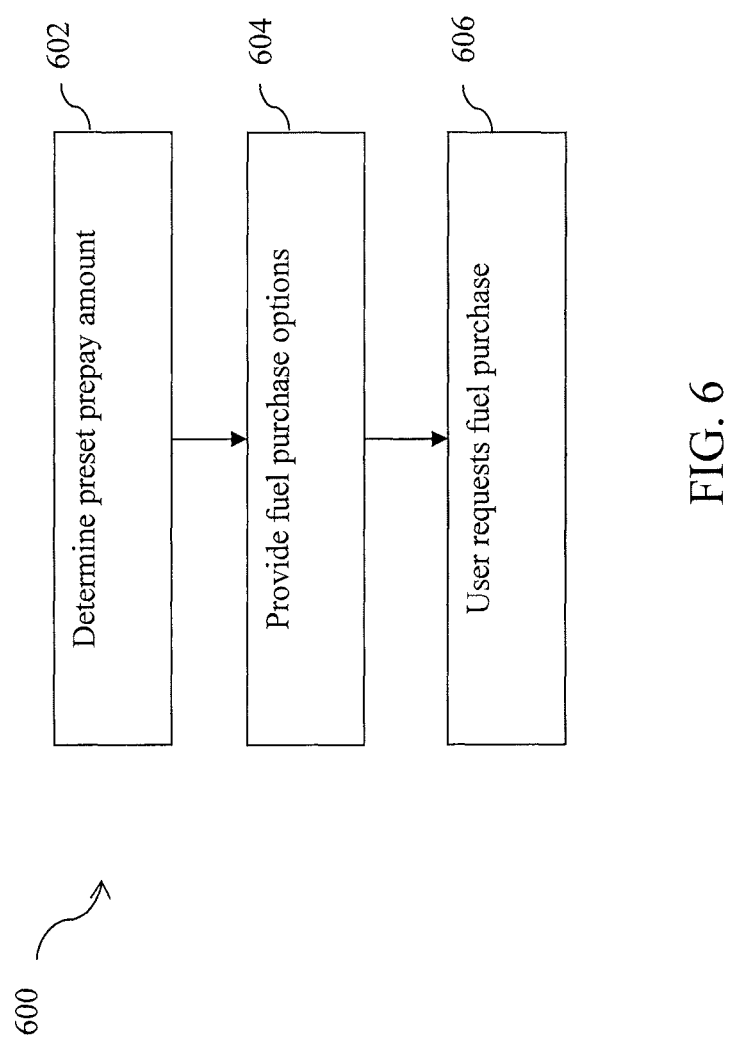
FIG. 6 is a flowchart showing a method for providing fuel purchase options according to an embodiment of the present disclosure.

Referring now to FIG. 6, a flowchart 600 of a method for providing fuel purchase options is illustrated according to an embodiment of the present disclosure. At step 602, a prepay amount to be suggested to user 102 is determined. In an embodiment, the application on the in vehicle system determines a prepay amount based on information such as fuel level, cost-per-unit of fuel, and user preferences. In another embodiment, it is payment provider server 160 that determines the prepay amount based on information such as fuel level, cost-per-unit of fuel, and user preferences. The user preferences may be a part of the user account information stored in database 166 of payment provider server 160, or stored on database 116 of user device 110, which may comprise an in-vehicle system and/or a mobile device. The cost-per-unit of fuel may be generated from data collected at payment provider server 160, or received from a third-party service provider. The fuel level may be determined by accessing the in-vehicle system of vehicle 202.

In an embodiment, user 102 may setup user preferences such that the prepay amount suggested to user 102 depends on the user preferences. The prepay amount may be the cost of fueling up to the maximum fuel capacity, which is calculated based on the fuel level at the time of fueling. The cost of fueling to full is calculated by multiplying the amount of fuel required to fill the tank by the cost-per-unit of fuel. The prepay amount may be the cost to fuel up to a preset fuel level. For example, if the user preference is to fuel up to half the tank, the prepay amount would be the cost to fill up to half the tank. The prepay amount may be a preset amount of money to spend on fuel. For example, if the user preference is to fuel twenty dollars, the prepay amount would be $20 or the cost to fill up the tank, whichever is less. In some embodiments, a combination of the above types of suggested prepay amounts are provided to user 102 by default or by settings in the user preferences.

At step 604, user 102 is provided with fuel purchase options. In an embodiment, the fuel purchase option includes one or more suggested prepay amounts determined by step 502. The purchase option may also include the option to enter in an amount of money to spend, or an option to fill up to a certain fuel level (e.g., fill up to half-tank). The purchase options are displayed on the GUI of the in-vehicle system and/or the mobile device.

At step 606, user 102 requests a fuel purchase by confirming or selecting an amount of fuel to purchase. In an embodiment, user 102 inputs the amount of fuel to purchase on the GUI of the in-vehicle system by confirming a prepay amount, selecting a prepay amount, or entering a different amount, such as an amount of money or a desired fuel level. An onboard application, such as payment provider application 120, receives the user input. In various embodiments, the onboard application transmits the fuel purchase request to payment provider server 160 and/or fuel provider server or device 140.

Figure 7:
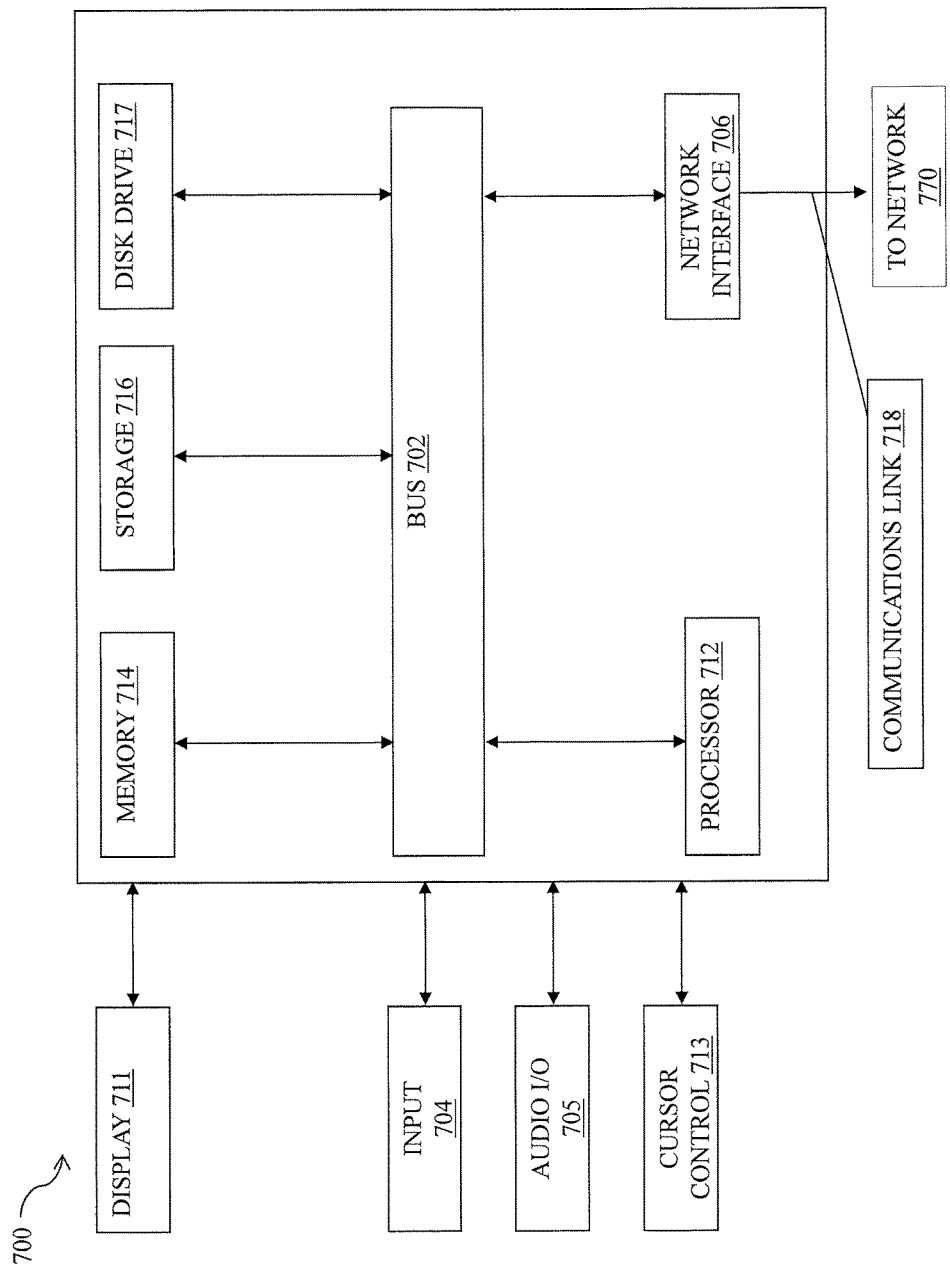
FIG. 7 is a block diagram of a system for implementing a device according to an embodiment of the present disclosure.

FIG. 7 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, image, or links, and/or moving one or more images, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another user device, service device, or a service provider server via network 770. In one embodiment, the transmission is wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various embodiments, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled with the non-transitory memory and configured to read instructions from the non-transitory memory to cause the system to perform operations comprising:
detecting a communication established between a mobile device associated with a user and an in-vehicle monitoring system of a vehicle;
in response to the detecting, determining user account information of a user account and user information associated with the user, wherein the user information comprises a destination address;
determining, through the in-vehicle system of the vehicle, vehicle information comprising a fuel level and a fuel consumption rate;
in response to determining the vehicle requires a refuel to arrive at the destination address based on the determined fuel level and the determined fuel consumption rate, providing a recommended fuel provider location on route to the destination address;
in response to detecting the vehicle is located at a fuel station within the recommended fuel provider location, establishing a communication session with the fuel station; and
transmitting, through the established communication session, an activation signal to the fuel station to activate the fuel station, wherein the activation signal comprises a fuel preference of the user and a payment authorization token corresponding to the user account of the user, wherein the activation signal causes the fuel station to automatically refuel the vehicle according to the fuel preference.

2. The system of claim 1, wherein the user account information includes user settings comprising at least one of a travel-time minimizing preference, a fuel-cost minimizing preference, a minimum fuel level preference, a fuel provider brand preference, or a fuel type requirement.

3. The system of claim 1, wherein the operations further, comprise:

retrieving traffic information, related to a route to the destination address, wherein the determining the vehicle requires a refuel to arrive at the destination address is further based on the traffic information.

4. The system of claim 1, wherein the operations further comprise:
determining a suggested time for the user to refuel the vehicle, wherein the recommended fuel provider location is provided to the user at the suggested time.

5. The system of claim 1, wherein the vehicle information further includes a current location, wherein the operations further comprise:
retrieving physical route information related to a route from the current location to the destination address, wherein the physical route information includes at least one of incline data or road conditions; and
retrieving fuel provider information comprising at least one of a fuel price or a wait time at the fuel provider location.

6. The system of claim 1, wherein the operations further comprise:
receiving fuel-provider check-in information via the communication session established with the fuel station at the recommended fuel provider location; and
generating the payment authorization token based on the fuel-provider check-in information.

7. The system of claim 1, wherein the operations further comprise processing a payment using the user account, and wherein the user account is an account maintained by a payment provider.

8. The system of claim 1, wherein the operations further comprise:
determining a prepay amount for refueling the vehicle based on the vehicle information and the fuel preference indicating whether to fill a tank, to fill to a preset fuel level, or to spend a preset amount.

9. The system of claim 1, wherein causing the fuel station to automatically refuel the vehicle according to the fuel preference comprises transmitting a signal to a robotic arm of the fuel station to cause the robotic arm to automatically insert a fuel hose into the vehicle.

10. A non-transitory machine-readable medium comprising machine-readable instructions executable to cause a machine to perform operations comprising:
detecting a communication established between a mobile device associated with a user and an in-vehicle monitoring system of a vehicle;
accessing vehicle information through the in-vehicle system of the vehicle, wherein the vehicle information comprises a fuel level and a fuel consumption rate;
determining a destination address for the user;
in response to determining the vehicle requires a refuel to arrive at the destination address based on the determined fuel level and the determined fuel consumption rate, providing a recommended fuel provider location on route to the destination address;
in response to detecting the vehicle is located at a fuel station within the fuel provider location, establishing a connection with a device at the recommended fuel provider location; and
a transmitting, through the established connection, an activation signal to the device to activate the fuel station, wherein the activation signal comprises a fuel preference of the user and a payment authorization token corresponding to a user account of the user.

11. The non-transitory machine-readable medium of claim 10, wherein the operations further comprise retrieving traffic information related to a route to the destination address.

12. The non-transitory machine-readable medium of claim 10, wherein the operations further comprising comprise:
determining a prepay amount for refueling the vehicle based on the vehicle information and the fuel preference indicating whether to fill a tank, to fill to preset fuel level, or to spend a preset amount.

13. A method, comprising:
detecting, by one or more hardware processors, a communication established between a mobile device associated with a user and an in-vehicle monitoring system of a vehicle;
in response to the detecting, accessing, by the one or more hardware processors, user account information of a user account and user information associated with the user, wherein the user information comprises a destination address;
determining, by the one or more hardware processors, through the in-vehicle system of the vehicle, vehicle information comprising a charge level and an electricity consumption rate;
in response to determining the vehicle requires a recharge to arrive at the destination address based on the determined charge level and the determined electricity consumption rate, providing, by the one or more hardware processors, a recommended recharging facility on route to the destination address;
in response to detecting the vehicle is located at a recharge station within the recommended recharging facility, establishing, by the one or more hardware processors, a communication session with the recharge station; and
transmitting, by the one or more hardware processors through the established communication session, an activation signal to the recharge station to activate the recharge station, wherein the activation signal comprises a recharge preference of the user and a payment authorization token corresponding to the user account of the user, wherein the activation signal causes the recharge station to automatically recharge the vehicle according to the recharge preference.

14. The method of claim 13, further comprising retrieving traffic information related to a route to the destination address, wherein the determining the vehicle requires a recharge to arrive at the destination address is further based on the traffic information.

15. The method of claim 13, further comprising determining a suggested time for the user to recharge the vehicle, wherein the recommended recharging facility is provided to the user at the suggested time.

16. The method of claim 13, wherein the vehicle information includes a current location, wherein the method further comprises:
retrieving physical route information related to a route from the current location to the destination address, wherein the physical route information includes at least one of incline data or road conditions; and
retrieving recharge facility information comprising at least one of a price or a wait time at the recharging facility.

17. The method of claim 13, further comprising:
receiving recharging facility check-in information via the communication session established with the recharge station at the recommended recharging facility; and generating the payment authorization token based on the recharging facility check-in information.

18. The method of claim 13, further comprising processing a payment using the user account, and wherein the user account is an account maintained by a payment provider.

19. The method of claim 13, further comprising:
determining a prepay amount for recharging the vehicle based on the vehicle information and the recharge preference indicating whether to recharge a battery of the vehicle in full, to recharge to a preset charge level, or to spend a preset amount.

20. The method of claim 19, wherein the payment authorization token comprises the prepay amount.

* * * * *

UNITED STATES PATENT AND TRADEMARK OFFICE
CERTIFICATE OF CORRECTION

PATENT NO. : 10,140,645 B2
APPLICATION NO. : 14/449974
DATED : November 27, 2018
INVENTOR(S) : Dennis Michael Driscoll and Michael Charles Todasco It is certified that error appears in the above-identified patent and that said Letters Patent is hereby corrected as shown below:

In the Specification

In Column 4, Line 1, change "cheek-in" to --check-in--.
In Column 10, Line 31, change "GUT" to --GUI--.
In Column 23, Line 64, change "in vehicle" to --in-vehicle--.

In the Claims

In Column 26, Line 66, remove ",". (Second Occurrence)
In Column 27, Line 1, remove ",".
In Column 27, Line 63, remove "a".

Signed and Sealed this
Fifth Day of May, 2020

Andrei Iancu
*Director of the United States Patent and Trademark Office*